Figure 1:
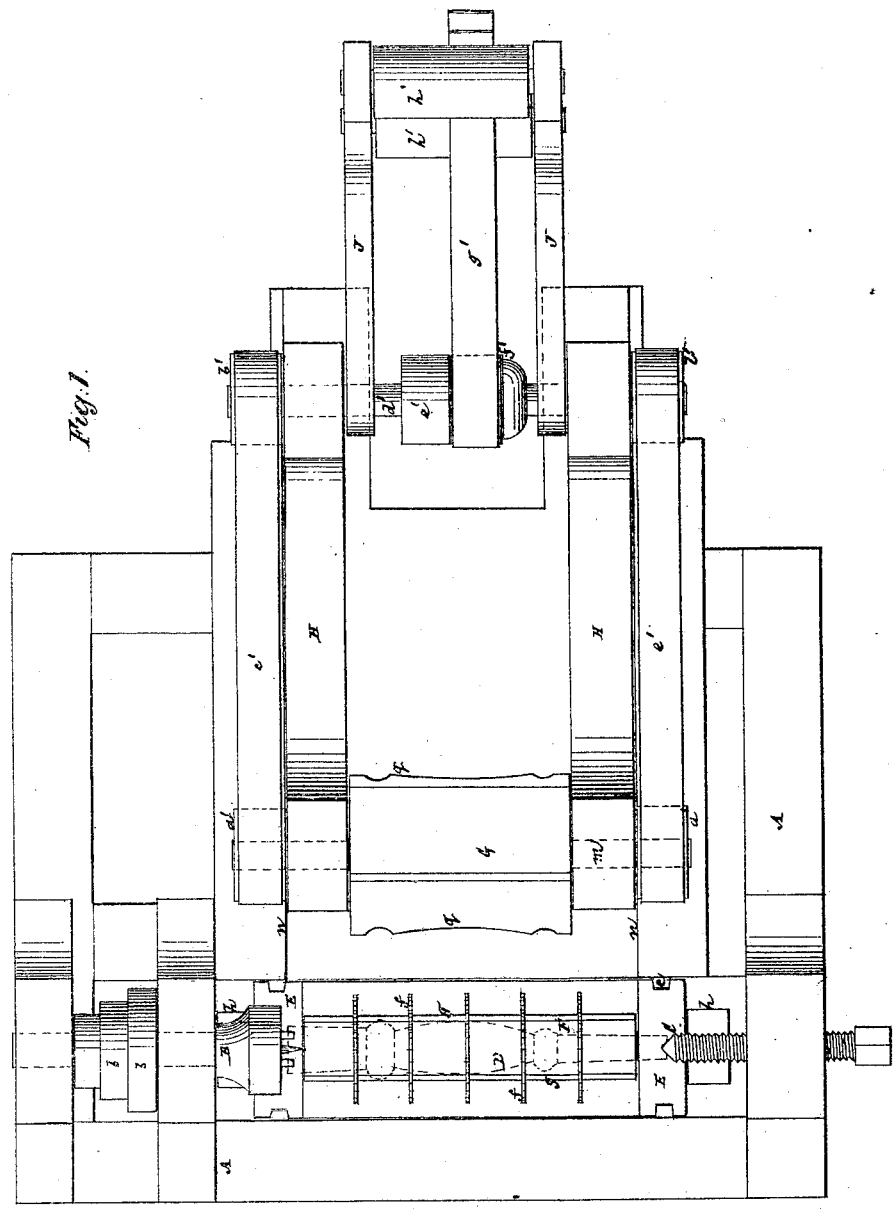

HILLRY CHAVONS.
Improvement in Lathes.

No. 119,012. Patented Sep. 19, 1871.

Witnesses:

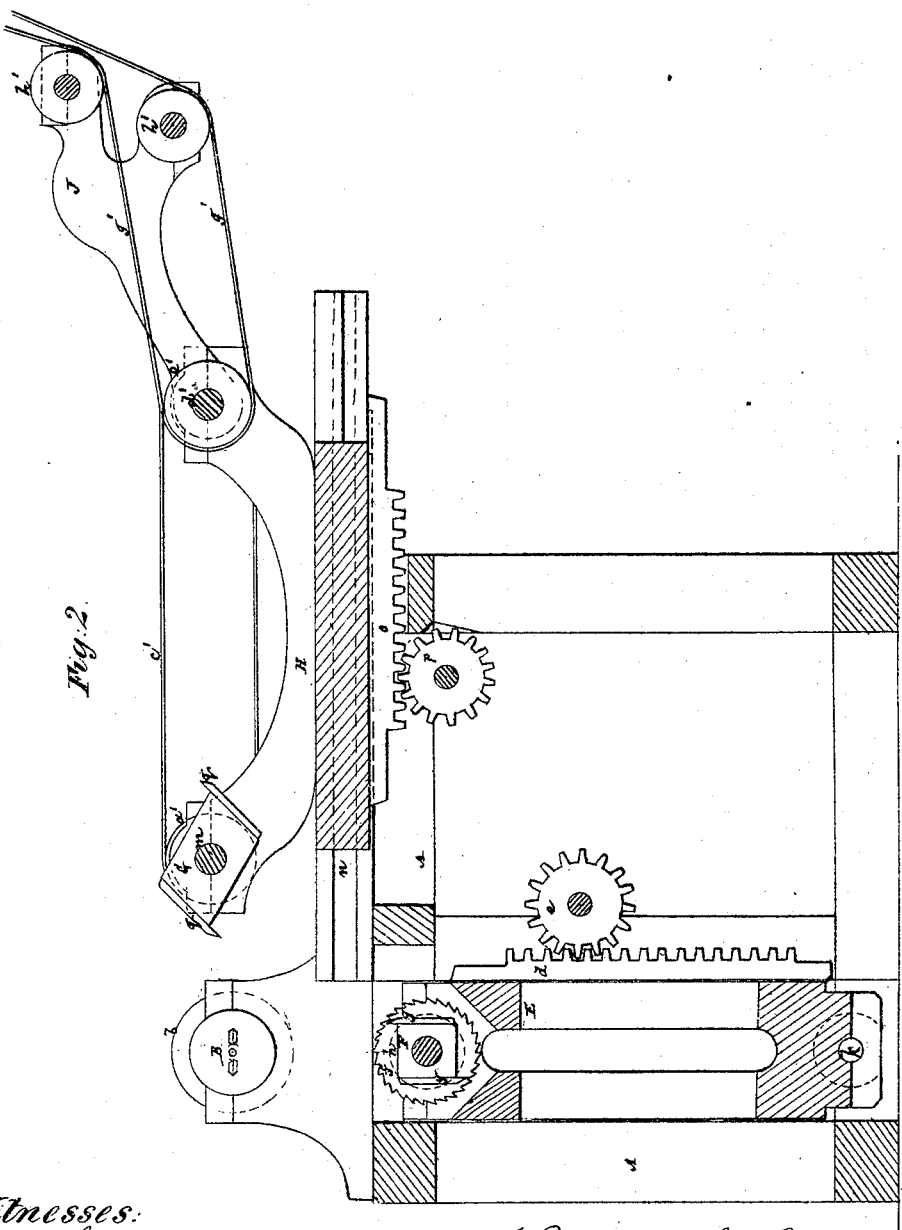

r119,012

UNITED STATES PATENT OFFICE.

HILLRY CHAVONS, OF UNION CITY, INDIANA, ASSIGNOR TO HIMSELF AND WILLIAM P. DE BOLT, OF SAME PLACE.

IMPROVEMENT IN LATHES.

Specification forming part of Letters Patent No. 119,012, dated September 19, 1871.

*To all whom it may concern:*

Be it known that I, HILLRY CHAVONS, of Union City, in the county of Randolph and State of Indiana, have invented certain new and useful Improvements in Lathes; and I do hereby declare that the following is a full, clear, and exact description of the same, reference being had to the accompanying drawing forming part of this specification, and in which—

Figure 1 represents a plan of a lathe constructed in accordance with my invention, and Fig. 2 a central longitudinal vertical section thereof.

Similar letters of reference indicate corresponding parts throughout both figures of the drawing.

The lathe which is the subject of this invention is applicable to both small and large work of different kinds, but is more especially designed for long heavy work, such as bed-posts, table-legs, wagon and carriage-hubs, spokes, and whiffletrees, the number, disposition, and shape of the cutters varying with the length of the stick to be worked and kind of work to be done. It will suffice here, however, to show and describe the invention as applied to the turning of table-legs. The invention consists in a combination, with a revolving mandrel carrying the stick to be worked, of a rising-and-falling gate, which is provided with a revolving cutter-head made up of circular saws and intervening or adjacent knives, that chisel or hew out the wood between and outside of the incision made by the saws, which have a radial projection beyond the knives, said devices serving to round and prepare the stick ready for the operation of a horizontally or laterally-advancing and revolving cutter-head, used in combination on the same machine for finishing the work as required. The invention also includes a novel extension-belt arrangement to provide for the movement of the cutter-heads, or either of them, up to and from the work without affecting the stretch of the belt.

Referring to the accompanying drawing, A represents the frame of the machine, which may be of any suitable construction. B is the lathe-mandrel, rotated by any one of a series of speed or driving-pulleys $b$, and serving, in connection with an opposite center, C, to carry the stick, which is illustrated by dotted lines in Fig. 1 as dressed or worked up into a table-leg, D. E is the vertical or rising-and-falling gate, arranged below the lathe-mandrel and center, and carrying the primary revolving cutter-head F, which rounds or preparatorily dresses the stick for its after finish by the beading and secondary cutter-head G. Said gate E is fitted to slide up and down between guides or ways $c\ c$, and may be operated by racks and pinions $d\ e$, or by any other suitable means. The revolving cutter-head F, carried by said gate at its top, is arranged to work directly under the stick, and consists of saws $f\ f$ and intervening or adjacent knives or cutters $g\ g$. The saws $f\ f$ may be placed one and a half inch (more or less) apart, and are of such diameter that they project one-sixteenth of an inch (more or less) beyond the knives $g\ g$. Thus arranged, when the gate E is raised the saws cut into the rough stick in advance of the knives, which latter chip out the wood between and at the side of the incisions made by the saws, said saws and knives thus working over the entire length of the stick by a process of sawing and hewing, as it were, to round or prepare the stick for the secondary cutter-head G. The gate E may be so adjusted and operated that it will move upward as required until it reaches a certain notch or point, when it will touch a spring or other device that arrests its further upward motion, when the saws and knives continue to revolve without operating on the wood. The shaft of the cutter-head F is rotated by pulleys $h$ through belts from lower pulleys $i$ on a shaft, $k$, carried by the gate. The stick having been thus prepared is then acted upon by the secondary or finishing cutter-head G, which is carried by an upper horizontal shaft, $m$, arranged to lie parallel with the mandrel line or center at the back or to one side of the latter, as it were. Said cutter-head shaft is carried by a sliding carrier, H, which is fitted to travel along horizontal ways $n\ n$ so as to adjust the cutter-head G up to or from the side of the stick. This motion is represented as being effected by a rack or racks and pinions $o\ p$, but a lever motion may be substituted therefor. Said cutter-head G, which, like the cutter-head F, also rotates in the same direction as the stick, is composed of or carries a series of bead-bits, $q\ q$, of the requisite shape, on their cutting-edges, to give the desired configuration and finish to the stick or article the latter is required to produce, so that when taken from the lathe it is finished or ready for oiling, if necessary. To provide for the advance of the cutter-head G by the sliding of its carrier H to effect this finishing dress of the stick, and afterward to retire the same ready for a repetition of such action on another stick, said cutter-head is rotated by pulleys $a'\, a'$, $b'\, b'$, and $c'\, c'$, connected with or carried by the sliding carrier H, the shaft $d'$ of the pulleys $b'\, b'$ extending across the rear of the sliding carrier H, and having fast-and-loose pulleys $e'\, f'$ on it, by which the cutter-head G is rotated or arrested, as required, through a driving-belt, $g'$, arranged to pass around either of the pulleys $e'\, f'$, and extended to pass under a pair of loose pulleys, $h'\, h'$, arranged one above the other at the back of a suspension frame, J, which is loosely hung or supported by the shaft $d'$ of the sliding carrier H. From the pulleys $h'\, h'$ the belt $g'$ passes around a driving-pulley carried by an overhead primary or line shaft. By this arrangement provision is made for moving the sliding carrier H up to and from the work without stretching the belt or causing it to slip, and the same arrangement is applicable to the cutter-head F of the vertically-sliding gate E. Both cutter-heads F G and stick operated on by them all rotate simultaneously and in like directions, and the action generally is that of a cutting as contradistinguished from a scooping one, either cutter-head, too, operating throughout the whole length of the stick at one time, and the stick being stationary in direction of its length.

What is here claimed, and desired to be secured by Letters Patent, is—

1. The combination, with the revolving mandrel B, of the sliding gate E and revolving cutter-head F, composed of saws $f\, f$ and knives $g\, g$, the whole being arranged for operation substantially as specified.

2. The combination of the upper horizontal or laterally-sliding carrier H and its revolving cutter-head G, composed of carving-cutters $q\, q$, the revolving mandrel B, and vertically-sliding gate E with its cutter-head made up of saws $f$ and knives $g$, essentially as and for the purposes herein set forth.

3. The combination, with the gate or carrier by which the revolving cutter-head is slid up to or from the work, of the suspension frame J, the fast pulley $e'$, the belt $g'$, and the loose pulleys $h'\, h'$, when arranged in relation with each other, substantially as shown and described.

HILLRY CHAVONS.

Witnesses:
WM. P. DE BOLT,
M. DEBOLT. (126.)